W. D. O'Brien.

Railroad Rail.

No. 1,891. Reissued Feb. 28, 1865.

Witnesses;
Samuel W. Sorrell

Inventor;
William D. O'Brien

N. PETERS, PHOTO-LITHOGRAPHER, WASHINGTON, D. C.

UNITED STATES PATENT OFFICE.

WILLIAM D. O'BRIEN, OF BROOKLYN, NEW YORK.

IMPROVEMENT IN RAILROAD-RAILS.

Specification forming part of Letters Patent No. 43,599, dated July 19, 1864; Reissue No. 1,891, dated February 28, 1865.

*To all whom it may concern:*

Be it known that I, WILLIAM DESMOND O'BRIEN, of Brooklyn, in the county of Kings and State of New York, have invented, made, and applied to use a certain new and useful Improvement in Tracks for City Railroads; and I do hereby declare that the following is a full, clear, and exact description of the nature and object of my said invention, reference being had to the annexed drawings, making part of this specification, wherein—

Figure 1:
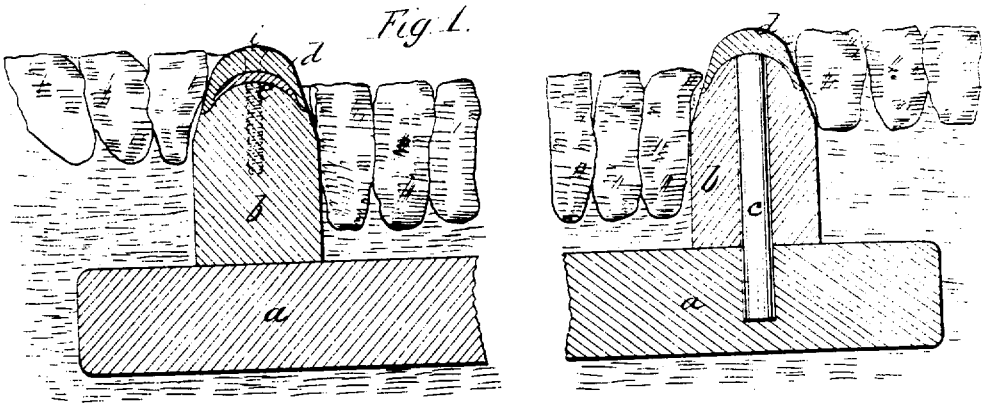
Figure 2:
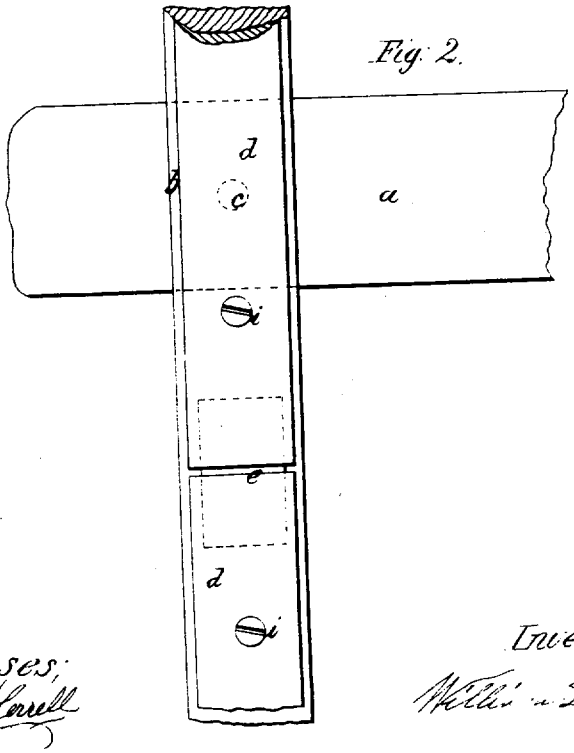

Figure 1 is a cross-section of one track, and Fig. 2 is a plan of one of the rails.

Similar marks of reference indicate the same parts.

The tracks for city or other railroads as heretofore usually constructed are found practically defective from many causes—viz., public vehicles traveling on such railroads are destructive to them as well as to such vehicles. The rails are forced outward by the action of the wheels of such vehicles, destroying the gage of the track and loosening the whole structure, and in turn such vehicles are severely strained and injured in endeavoring to surmount the shoulders of the rails while sliding on the flat or grooved iron they have been riding on. Again, most rails used, being flat on their under surface, and resting on flat sills, allow the water which enters at the joints to flow along the sill-surfaces, causing rapid decay to the whole structure; also, all joint-plates hitherto used have been flat on their under surfaces, allowing the water to rest under them, which, by the severe pressure and concussion at the joints, aids rapidly in destroying and rotting the sills in this most vulnerable point. All these and many other defects my improved rail and joint-plate have been found practically free from, and while said rail offers no accommodation to public vehicles, it causes them not the least inconvenience or injury, because the surface of the street is in a condition to be traveled over nearly the same as if there were no railroad.

The nature of my said invention consists in an iron bar for railroads, formed with a curved under side adapted to resting upon the convex surface of the sill, said rail or bar also having a curved upper surface with slanting sides or edges. Said rail is sectionally like a crescent—thicker in the middle than at the edges—and sufficiently strong where the wheels run upon the bar, while the thinner and slanting sides or edges are only sufficiently thick to guide the wheel-flanges, and form a cap to protect the sill. I term said bar the "economical roof or crescent rail," because the same is much lighter than the bars employed under similar circumstances prior to my invention. My said bar, when laid upon the sill, is to be secured by screws entered vertically through it into the sill. Below the joints of the separate bars I insert a curved metal plate, which prevents the ends of the rail becoming embedded into the sill, and both the rail and the joint-plate shed off any water that falls on the rail, keeping the upper surface of the sill, as well as the portion under the joint-plates, as dry as possible, and any accumulation or percolation of water along between the rail and sill is entirely prevented, and the sill rendered more durable than heretofore.

My said invention will be fully understood from the foregoing and a reference to the drawings, wherein *a* is a cross-tie, to which the sill or sleeper *b* is connected by the dowel or tree-nail *c*, or in any other suitable manner.

*d* is my improved roof-rail, formed in the general shape shown, but of a size and weight according to the intended use.

*e* is a plate inserted into the upper surface of the sill, beneath each joint, to render the joint more rigid and durable, and *i i* are screws inserted through the rails into the sill below.

The paving-stones may be laid as shown, so as to come up to the top of the rail at the outside and dropped down between the tracks to allow room for the flanges of the wheels.

It will now be evident that this manner of forming city or other railroad tracks possesses great advantages over all others heretofore invented, because lighter rails can be used, and the sill is more effectually protected from the action of moisture.

The joint-plate *e* is curved at its under side, as represented, for the purposes mentioned, while the upper surface is to be of a form adapted to coincide with the under side of whatever shape of railroad-bar it is to receive.

I do not claim a flat rail with vertical flanges, neither do I claim securing rails to sills by means of screw-bolts and nuts; but

What I claim, and desire to secure by Letters Patent, is—

1. An iron bar formed thicker in the middle than at the sides or edges, and curved in substantially the form specified, for the purposes set forth.

2. The joint-plate *e*, curved on its under side to set upon the sill, and with its upper surface corresponding to the under side of the railroad-bars, for the purposes and as specified.

In witness whereof I have hereunto set my signature this 24th day of January, 1865.

WILLIAM D. O'BRIEN.

Witnesses:

THOS. GEO. HAROLD,
CHAS. H. SMITH.